United States Patent
Lim et al.

(10) Patent No.: US 8,483,264 B2
(45) Date of Patent: Jul. 9, 2013

(54) APPARATUS AND METHOD FOR CHIP LEVEL EQUALIZATION IN WIRELESS COMMUNICATION SYSTEM

(75) Inventors: Chae-Man Lim, Seoul (KR); Ho-Il Kim, Yongin-si (KR); Kyung-Ha Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 12/984,193

(22) Filed: Jan. 4, 2011

(65) Prior Publication Data

US 2011/0170588 A1 Jul. 14, 2011

(30) Foreign Application Priority Data

Jan. 11, 2010 (KR) .................. 10-2010-0002194

(51) Int. Cl.
*H03H 7/40* (2006.01)
*H04B 1/10* (2006.01)

(52) U.S. Cl.
USPC .......................................... 375/231; 375/350

(58) Field of Classification Search
USPC ................. 375/285, 229, 230, 231, 316, 346, 375/350; 333/18, 28 R
See application file for complete search history.

(56) References Cited

U.S. PATENT DOCUMENTS

| | | | |
|---|---|---|---|
| 5,513,215 A * | 4/1996 | Marchetto et al. | 375/233 |
| 2003/0007573 A1* | 1/2003 | Baldemair et al. | 375/316 |
| 2008/0095141 A1* | 4/2008 | Kong et al. | 370/345 |
| 2009/0290630 A1* | 11/2009 | Pietraski et al. | 375/232 |
| 2010/0098145 A1* | 4/2010 | Ki et al. | 375/232 |
| 2012/0307930 A1* | 12/2012 | Ma et al. | 375/267 |

* cited by examiner

*Primary Examiner* — Tesfaldet Bocure
(74) *Attorney, Agent, or Firm* — Jefferson IP Law, LLP (57) ABSTRACT

An apparatus and a method for improving performance of an equalizer in a wireless communication system are provided. The apparatus of a reception end includes a search unit and an estimator. The search unit determines power values of respective taps inside a window based on a signal received via a pilot channel, and classifies the taps into one or more meaningful taps and one or more noise taps. The estimator allocates one or more 1-tap channel estimators to the one or more meaningful taps, and determines a channel estimation vector based on a channel estimation value of the one or more meaningful taps determined by the one or more 1-tap channel estimators.

19 Claims, 6 Drawing Sheets

APPARATUS AND METHOD FOR CHIP LEVEL EQUALIZATION IN WIRELESS COMMUNICATION SYSTEM

PRIORITY

This application claims the benefit under 35 U.S.C. §119 (a) of a Korean patent application filed in the Korean Intellectual Property Office on Jan. 11, 2010 and assigned Serial No. 10-2010-0002194, the entire disclosure of which is hereby incorporated by reference.

BACKGROUND OF THE INVENTION

1. Field of the Invention

The present invention relates to a wireless communication system. More particularly, the present invention relates to an apparatus and a method for improving performance of a half-chip interval chip equalizer in a wireless communication system.

2. Description of the Related Art

Generally, a reception end of a digital communication system estimates a channel based on a pilot signal sent by a transmitter, and trains a half-chip interval chip equalizer using the estimated channel to perform channel equalization. A channel estimator has a number of taps of a fixed length for ease of hardware design and can variably control the length of a channel estimation vector within a maximum fixed length depending on a channel environment. The channel estimator inside the equalizer may control the length of the channel estimation vector, but hardware having the number of taps of a sufficiently long fixed length should be provided with consideration of a maximum delay value even in the case where an actual channel has a sparse channel characteristic.

The conventional channel estimator of a fixed length has several problems and limitations. The conventional channel estimator has a tap of a predetermined length with consideration of a maximum delay time that may occur in a channel and an investable hardware resource. For example, a chip level equalizer provided to a reception end inside a terminal of a 3rd Generation Partnership Project (3GPP) Wideband Code Division Multiple Access (WCDMA) communication system has a 40 tap-channel estimator. Where hardware of a number of fixed taps is employed, a channel estimator operates all taps to perform channel estimation regardless of a delay time of a channel, or may perform channel estimation using only a smaller number of taps than a supportable maximum number of taps with consideration of a channel delay time.

For exceptional channel environments, for example, environments such as a riverside reflective wave, a long delay channel due to a relay, etc., a maximum delay time of a channel may be longer than a time supported by a maximum number of taps of a channel estimator inside a chip level equalizer. In this case, due to an interference effect given by a path outside a window of the equalizer, the performance of the chip level equalizer deteriorates. Furthermore, since the exceptional channel environments generally have a sparse characteristic, estimation of a meaningless noise tap is performed, so that the performance of the equalizer deteriorates and power and a hardware resource are wasted.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for improving the performance of a half-chip interval chip equalizer in a wireless communication system.

Another aspect of the present invention is to provide an apparatus and a method for improving the performance of an equalizer using a plurality of 1-tap channel estimators in a wireless communication system.

Another aspect of the present invention is to provide an apparatus and a method for allocating a plurality of 1-tap channel estimators to a tap where a Channel Impulse Response (CIR) is searched for in a wireless communication system.

In accordance with an aspect of the present invention, an apparatus of a reception end in a wireless communication system is provided. The apparatus includes a search unit for determining power values of respective taps inside a window based on a signal received via a pilot channel, and for classifying the taps into one or more meaningful taps and one or more noise taps, and an estimator for allocating one or more 1-tap channel estimators to the one or more meaningful taps, and for determining a channel estimation vector using a channel estimation value of the one or more meaningful taps determined by the one or more 1-tap channel estimators.

In accordance with another aspect of the present invention, a channel estimation method of a reception end in a wireless communication system is provided. The method includes determining power values of respective taps inside a window based on a signal received via a pilot channel, classifying the taps into one or more meaningful taps and one or more noise taps based on the power values, allocating one or more 1-tap channel estimators to the one or more meaningful taps, and determining a channel estimation vector based on channel estimation values of the one or more meaningful taps determined by the one or more 1-tap channel estimators.

Other aspects, features, and advantages of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for improving the performance of a chip equalizer in a wireless communication system. An exemplary embodiment of the present invention is described using a Code Division Multiple Access (CDMA) or Wideband CDMA (WCDMA) wireless communication system as an example, and is also applicable to a different wireless communication system that estimates a channel in a time domain.

A reception end of an exemplary embodiment of the present invention performs a Channel Impulse Response (CIR) search by recycling a hardware resource of a multi-path search unit built in a modem. Depending on the results of the CIR search, the reception end classifies taps inside a search window into meaningful taps and noise taps. Unlike the conventional channel estimator having a fixed tap or successive taps of a variable length half-chip interval, the reception end includes a sparse channel estimator having a plurality of 1-tap channel estimators, and does not perform a correlation operation for channel estimation on the noise taps classified as a result of the CIR search, but performs correlation operation for 1-tap channel estimation on a predetermined number of taps among the meaningful taps. The sparse channel estimator denotes a channel estimator designed for estimating a channel of a sparse characteristic. The channel of the sparse characteristic denotes a channel of an environment where a time difference between meaningful reception values is relatively large because a difference between multi-paths is large.

The conventional art has performed a correlation operation on all taps or some successive taps provided to a channel estimator and then has aimed to improve performance through a noise reduction technique, such as Finite Impulse Response (FIR) filtering, Infinite Impulse Response (IIR) filtering, and the like. A general CDMA reception end has a path search unit for searching for path information of a channel and a receiver having a plurality of fingers. The general reception end performs multi-path search at a $T_c$(=chip length)/2 basis resolution through the path search unit, and allocates a finger to a searched path to perform path tracking of a $T_c/8$ basis, and demodulates a signal. In addition, the general reception end controls a window of a channel estimator inside a chip level equalizer using multi-path information provided from the path search unit and a hook receiver.

Unlike the above-described conventional art, the reception end according to an exemplary embodiment of the present invention obtains input sample offset information of $T_c/8$ resolution of a path having maximum energy using multi-path information of a hook reception end, adds a CIR search function to the multi-path search unit, and sorts meaningful taps to which 1-tap channel estimators for channel estimation of an equalizer are to be allocated inside a CIR search window using the input sample offset information of $T_c/8$ resolution through the multi-path search unit. Channel estimation according to an exemplary embodiment of the present invention includes (1) CIR power search and tap classify step, and (2) 1-tap channel estimator allocation and entire channel estimation vector generation step.

The (1) CIR power search and tap classify step is performed as follows. To allocate 1-tap channel estimators provided to a sparse channel estimator to a proper path position, a reception end should search for CIR power. For the CIR search, a multi-path search unit provided to a modem may be generally recycled. The reception end accumulates power values of a correlation operation every $N_{coh}$ (for example: 512 or 1024) chip using correlators having a window of a size $N_w$ (for example: 128) having an interval of $T_c/2$, provided to the multi-path search unit. In addition, the reception end reduces a noise component from the power values generated every $N_{coh}$ chip. For example, the reduction of the noise component may be performed through a moving average using a window of a size $N_{noncoh}$ (for example: 1, 2, 4, 8), or first order IIR filtering that applies a forgetting factor $\alpha$ ($0 \leq \alpha \leq 1$). The reception end determines an entire power value that sums power values of the correlation operation for all taps inside a search window, and then sets a threshold value having a predetermined ratio with respect to the entire power value. In addition, the reception end compares the threshold value with power values of all the taps inside the search window. The reception end classifies taps having a power value greater than the threshold value into meaningful taps, and classifies taps having a power value less than or equal to the threshold value into noise taps.

The (2) 1-tap channel estimator allocation and entire channel estimation vector generation step is performed as follows. When the number of the meaningful taps $N_g$ is greater than the number of 1-tap channel estimators $N_f$ provided to a channel estimator, the reception end sorts upper $N_f$ taps for a power value from $N_g$ meaningful taps, and allocates 1-tap channel estimators using position information of the sorted $N_f$ taps. In contrast, when the number of the meaningful taps $N_g$ is less than or equal to the number of the 1-tap channel estimators $N_f$ provided to the channel estimator, the reception end allocates the 1-tap channel estimators to all of the $N_g$ meaningful taps without the above-described sorting. A channel estimator vector of a length $L_f$ is determined by arranging in a time order channel estimation values generated every 512 chip by the 1-tap channel estimator. A channel estimation value of a position to which a 1-tap channel estimator has not been allocated is set to '0+0j'. According to an exemplary embodiment of the present invention, channel estimation values of a position to which the 1-tap channel estimator has not been allocated may be determined through interpolation or low pass filtering. Hereinafter, a construction and an operation of a reception end for performing equalization are described below in more detail with reference to accompanying drawings.

Figure 1:
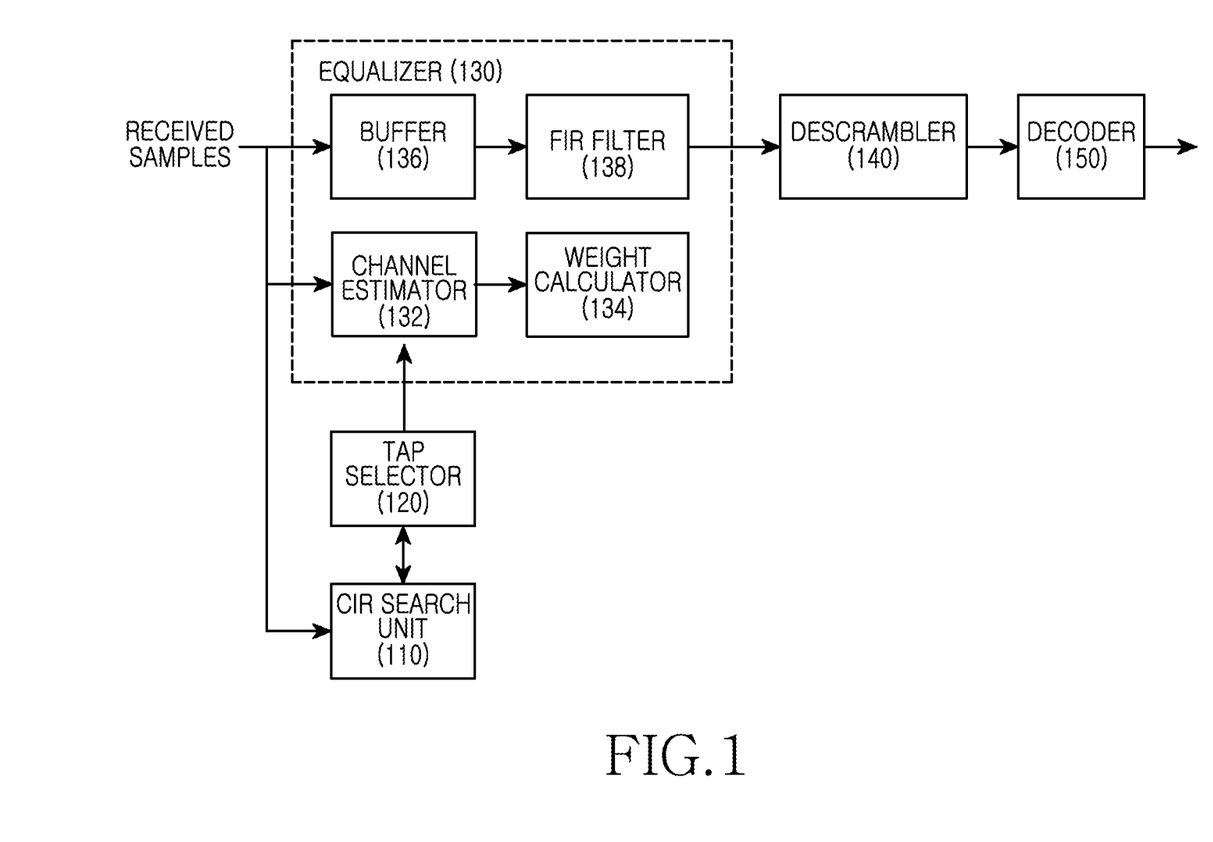
FIG. 1 is a block diagram illustrating a reception end in a wireless communication device according to an exemplary embodiment of the present invention.

FIG. 1 is a block diagram illustrating a reception end in a wireless communication device according to an exemplary embodiment of the present invention. FIG. 1 illustrates only functional blocks related to an equalization function in the construction of a reception end for convenience in description. Therefore, the reception end of a wireless communication system according to an exemplary embodiment of the present invention may further include other blocks for reception of a signal and data processing besides the blocks illustrated in FIG. 1.

Referring to FIG. 1, the reception end includes a CIR search unit 110, a tap selector 120, an equalizer 130, a descrambler 140, and a decoder 150.

The CIR search unit 110 determines CIR distribution of a channel using a signal received via a pilot channel. The CIR search unit 110 determines power value distribution in a pilot channel, and determines a meaningful tap, that is, CIR according to the power value distribution. The CIR search unit 110 generates power values of a correlation operation every $N_{coh}$ by performing the correlation operation having an interval of $T_c/2$ and a window of a size $N_w$ (for example: 128). In addition, the CIR search unit 110 reduces a noise component by performing a moving average using a window of a size $N_{noncoh}$ (for example: 1, 2, 4, 8), or by performing first order IIR filtering that applies a forgetting factor $\alpha$ ($0 \leq \alpha \leq 1$) on the power values generated every $N_{coh}$. The CIR search unit 110 sets a threshold value using an entire power value that sums power values of the correlation operation of all taps inside the window. For example, the threshold value is determined by multiplying the entire power value by a specific constant greater than 0 and smaller than 1. The CIR search unit 110 compares the threshold value with power values of all taps inside the window, classifies taps having a power value greater than the threshold value into meaningful taps, and classifies taps having a power value less than or equal to the threshold value into noise taps.

The tap selector 120 sorts taps to which a 1-tap channel estimator is to be allocated from the meaningful taps determined by the CIR search unit 110. When the number of the meaningful taps $N_g$ is greater than the number of 1-tap channel estimators $N_f$ provided to the reception end, the tap selector 120 sorts upper $N_f$ taps for a power value from $N_g$ meaningful taps. In contrast, when the number of the meaningful taps $N_g$ is less than or equal to the number of the 1-tap channel estimators $N_f$ provided to the channel estimator, the tap selector 120 sorts all of the $N_g$ meaningful taps.

The equalizer 130 estimates a channel using a plurality of 1-tap channel estimators, and performs equalization on a data signal using the estimated channel. The equalizer 130 includes a channel estimator 132, a weight calculator 134, a buffer 136, and a FIR filter 138. The channel estimator 132 includes a plurality of 1-tap channel estimators. The channel estimator 132 allocates the 1-tap channel estimators to the taps sorted by the tap selector 120, and estimates a channel using the 1-tap channel estimators. According to an exemplary embodiment of the present invention, the channel estimator 132 may additionally allocate the 1-tap channel estimators to not only the meaningful taps sorted by the tap selector 120 but also to a predetermined number of taps adjacent to the meaningful taps. A detailed function of the channel estimator 132 is described further below with reference to FIG. 2. The weight calculator 134 calculates a weight vector for equalization using the channel estimation vector determined by the channel estimator 132. The buffer 136 temporarily stores data samples of received samples. When calculation of a weight vector is completed by the weight calculator 134, the buffer 136 outputs the stored data samples to the FIR filter 138. The FIR filter 138 filters the data samples provided from the buffer 136 using the weight vector calculated by the weight calculator 134. The FIR filter 138 sets a filter window primarily using data samples to be equalized, and then equalizes the data samples by multiplying the data samples inside the filter window by the weight vector, and summing the samples multiplied by the weight vector.

The descrambler 140 performs descrambling, that is, Pseudo Noise (PN) dispreading on equalized data samples. The decoder 150 recovers an information bit line by decoding dispread data samples.

Figure 2:
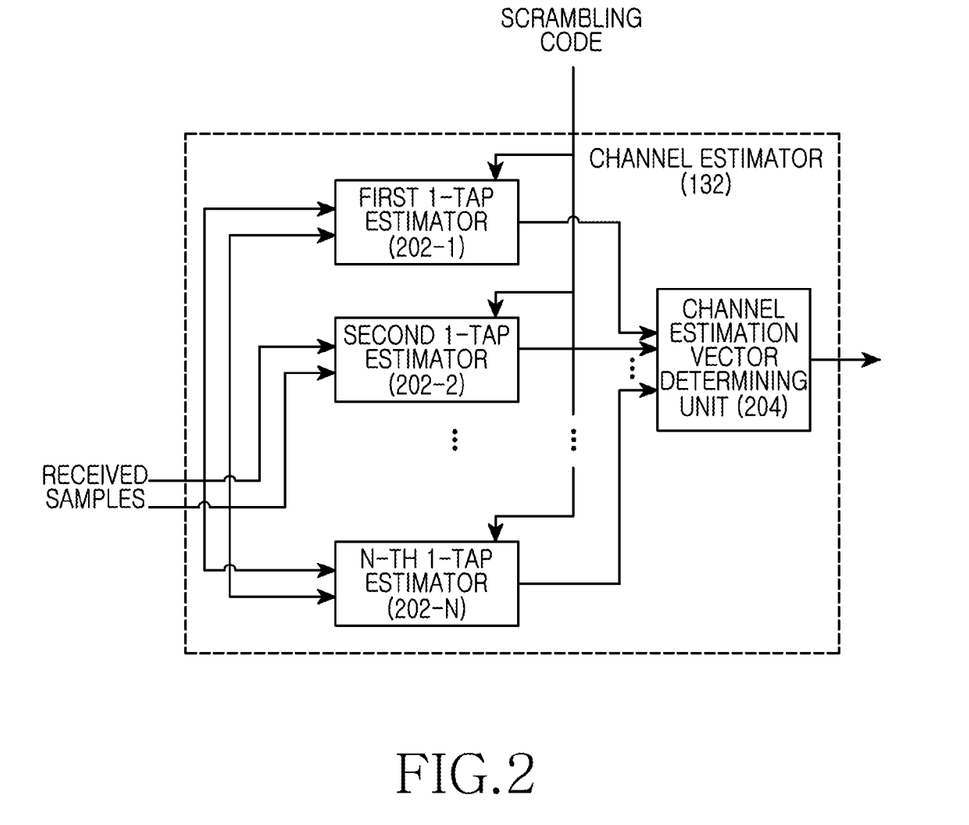
FIG. 2 is a block diagram illustrating a channel estimator in a wireless communication device according to an exemplary embodiment of the present invention.

FIG. 2 is a block diagram illustrating a channel estimator 132 in a wireless communication device according to an exemplary embodiment of the present invention.

Referring to FIG. 2, the channel estimator 132 includes a plurality of 1-tap estimators 202-1 to 202-N, and a channel estimation vector determining unit 204. Each of the plurality of 1-tap estimators 202-1 to 202-N determines a channel estimation value for a tap at a relevant position using received samples and a scrambling code.

Figure 3:
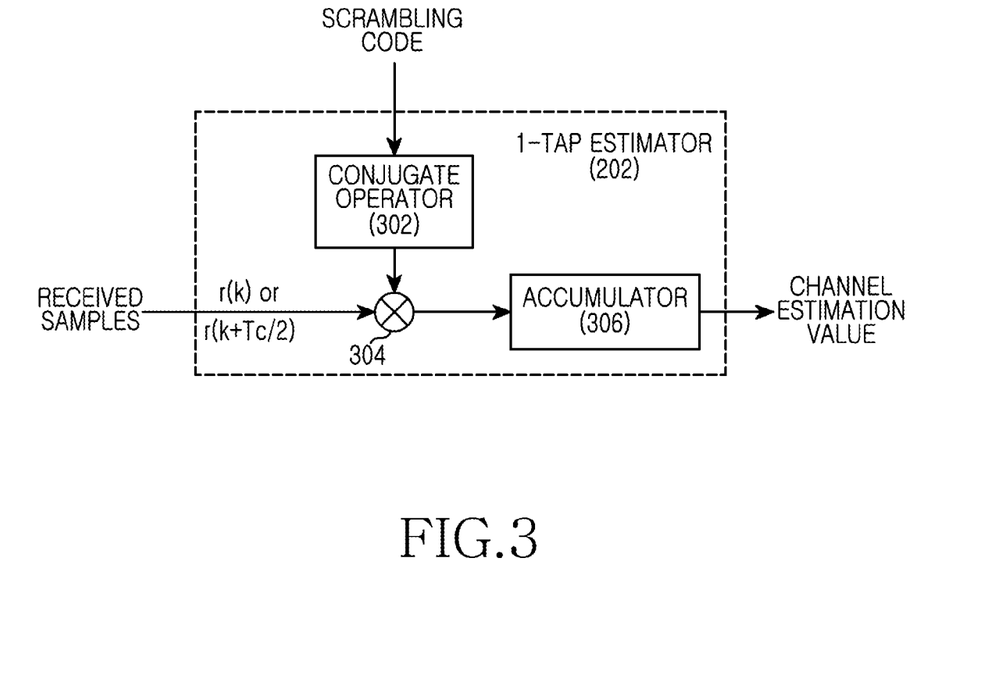
FIG. 3 is a block diagram illustrating a 1-tap channel estimator in a wireless communication device according to an exemplary embodiment of the present invention.

FIG. 3 is a block diagram illustrating each of N available 1-tap channel estimators 202-1 to 202-N in a wireless communication device according to an exemplary embodiment of the present invention.

Referring to FIG. 3, each of the 1-tap channel estimators 202-1 to 202-N includes a conjugate operator 302, a multiplier 304, and an accumulator 306. The conjugate operator 302 calculates a conjugate value of an element corresponding to a position of a relevant tap among elements of a provided scrambling code, and the multiplier 304 multiplies a sample corresponding to the position of the relevant tap among the conjugate value and received samples. The accumulator 306 accumulates and sums $N_{coh}$ multiplication values within a coherent time. The result of the accumulated sum is a channel estimation value of a relevant tap. Each of the 1-tap channel estimators 202-1 to 202-N determines a channel estimation value at a tap of a relevant position by receiving received samples, performing descrambling on a sample corresponding to a position of a relevant tap among the received samples using a provided scrambling code, and then accumulating and summing $N_{coh}$ descrambled samples within a coherent time. The received samples are values sampled with an interval of $T_c/2$. A sample used for determining the channel estimation value is a sample at a position of an integer multiple of $T_c$, or a sample at a position distant away by $T_c/2$ from an integer multiple position of $T_c$.

The channel estimation vector determining unit 204 determines a channel estimation vector using channel estimation values of meaningful taps provided from the plurality of 1-tap channel estimators 202-1 to 202-N. The channel estimation vector determining unit 204 determines a channel estimation vector by arranging the channel estimation values in a time order. The channel estimation value of a position where the plurality of 1-tap channel estimators 202-1 to 202-N have not been allocated is set to '0+0j'. According to an exemplary embodiment of the present invention, the channel estimation vector determining unit 204 may determine a channel estimation value of a position where the 1-tap channel estimator has not been allocated through interpolation or low pass filtering.

Figure 4:
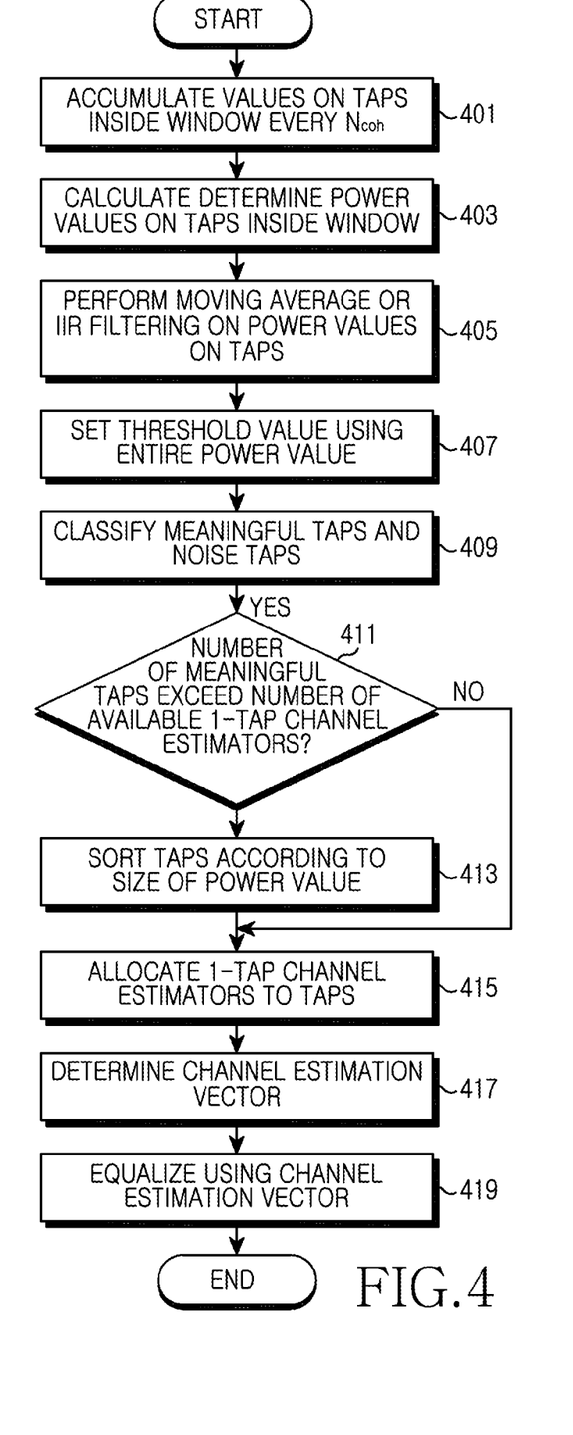
FIG. 4 is a flowchart illustrating an equalizing procedure of a reception end in a wireless communication device according to an exemplary embodiment of the present invention.
Figure 5A:
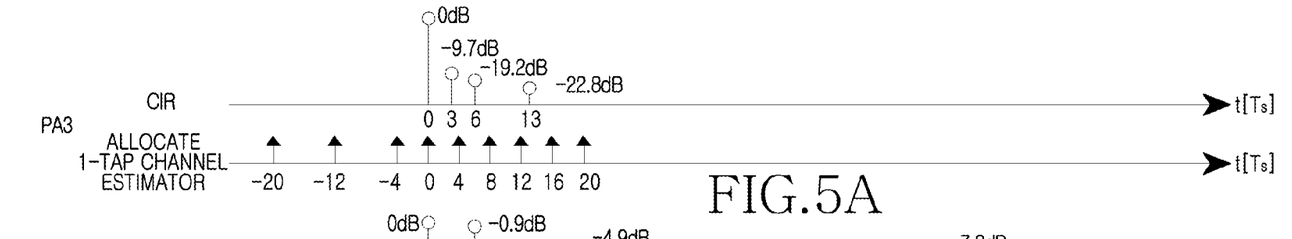
FIGS. 5A-5D are views illustrating allocation results of a 1-tap channel estimator in a wireless communication device according to an exemplary embodiment of the present invention.
Figure 5B:
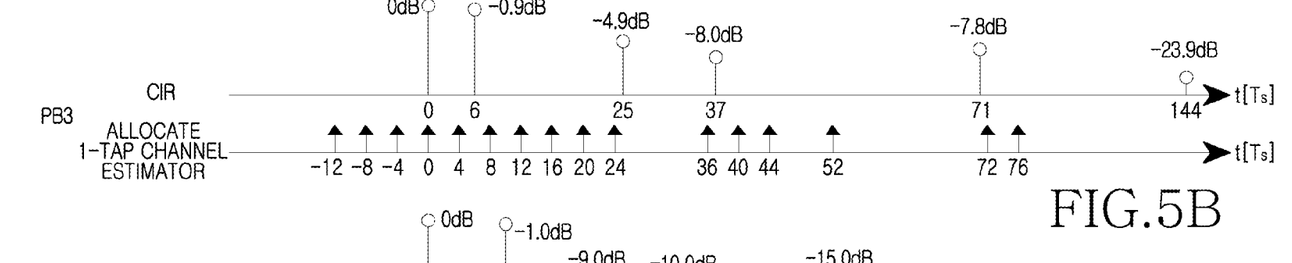
Figures 5C, 5D:
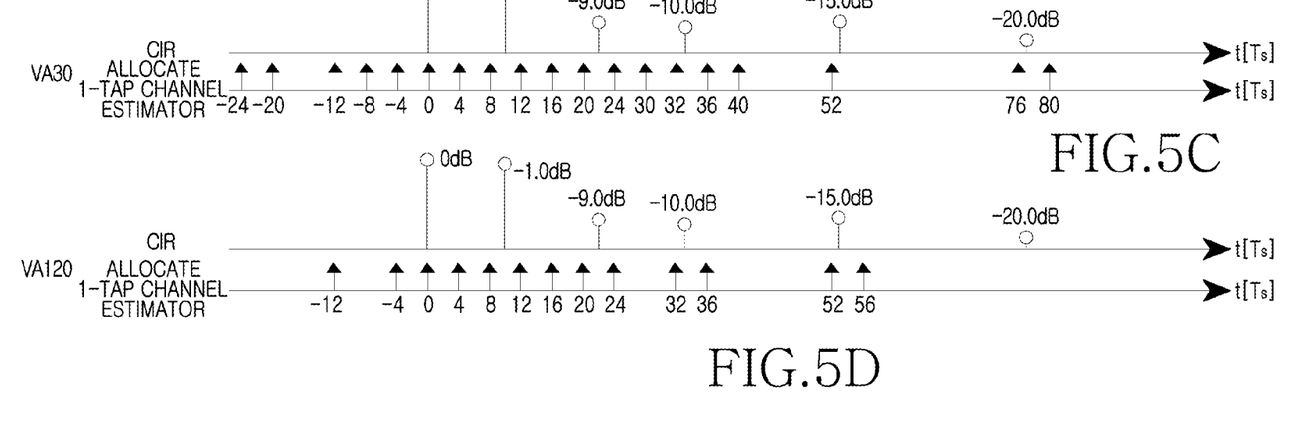

FIG. 4 is a flowchart illustrating an equalizing procedure of a reception end in a wireless communication device according to an exemplary embodiment of the present invention.

Referring to FIG. 4, the reception end accumulates values on respective taps inside a window every $N_{coh}$ chip with respect to samples received via a pilot channel in step 401. An interval between the taps is $T_c/2$. The accumulating of the values on the taps is to increase an accuracy of a power value using that a repeated pilot symbol, and may be omitted depending on a specific embodiment.

The reception end determines power values on taps inside the window in step 403. The reception end calculates power values of respective taps by performing a correlation operation of the window size on the respective taps.

After calculating the power values on the respective taps inside the window, the reception end performs a moving average or IIR filtering on the power values on the taps in step 405. The moving average is performed using the window of a size of $N_{noncoh}$, and the IIR filtering is performed using an attenuation coefficient greater than 0 and less than 1. The moving average and the IIR filtering reduce a noise component in the power values, and may be omitted depending on a specific embodiment.

The reception end sets a threshold value using an entire power value, which is sum of the power values on the taps inside the window in step 407. The threshold value may be proportional to the entire power value. For example, the reception end determines the threshold value by multiplying the entire power value by a specific constant greater than 0 and less than 1.

After setting the threshold value, the reception end classifies taps inside the window into meaningful taps and noise taps using the threshold value in step 409. The reception end classifies taps having a power value greater than the threshold value into the meaningful taps, and classifies taps having a power value less than or equal to the threshold value into the noise taps. The reception end determines candidate taps to which 1-tap channel estimators are to be allocated by determining the meaningful taps.

After sorting the meaningful taps, the reception end determines whether the number of the meaningful taps exceeds the number of available 1-tap channel estimators in step 411. When the number of the meaningful taps does not exceed the number of available 1-tap channel estimators, the reception end proceeds to step 415.

In contrast, when the number of the meaningful taps exceeds the number of available 1-tap channel estimators, the reception end sorts $N_f$ taps according to the sizes of power values in step 413. Since 1-tap channel estimators cannot be allocated to all of the meaningful taps, the reception end sorts taps to which the 1-tap channel estimator is to be allocated in the order of a decreasing power value. As the power value is large, a more accurate channel estimation value may be obtained.

The reception end allocates 1-tap channel estimators to meaningful taps in step 415. The reception end sets the 1-tap channel estimators such that the reception end may determine channel estimation values of the meaningful taps from samples corresponding to the meaningful taps by allocating the 1-tap channel estimators to the position of the meaningful taps. According to an exemplary embodiment of the present invention, the reception end may additionally allocate the 1-tap channel estimators not only to the meaningful taps but also to a predetermined number of taps adjacent to the meaningful taps.

After allocating the 1-tap channel estimators, the reception end determines a channel estimation vector in step 417. The reception end determines channel estimation values of the meaningful taps using the 1-tap channel estimators, and determines the channel estimation vector by listing the channel estimation values in a time order. A channel estimation value of a position to which the 1-tap channel estimator has not been allocated is set to '0+0j'. According to an exemplary embodiment of the present invention, the reception end may determine a channel estimation value of a position to which the 1-tap channel estimator has not been allocated through interpolation or low pass filtering.

After determining the channel estimation vector, the reception end performs equalization on data samples using the channel estimation vector in step 419. The reception end calculates a weight vector for equalization using the channel estimation vector, and filters the data samples using the weight vector. The reception end sets a filter window around data samples to be equalized, multiplies the data samples inside the filter window by the weight vector, and sums the samples multiplied by the weight vector, thereby equalizing the data samples.

FIGS. 5A-5D are views illustrating allocation results of a 1-tap channel estimator in a wireless communication according to an exemplary embodiment of the present invention. FIGS. 5A-5D illustrate allocation results of 1-tap channel estimators when simulation of an exemplary embodiment of the present invention has been performed under environments of PedestrianA with 3 kmph (PA3), PedestrianB with 3 kmph (PB3), VehicularA with 30 kmph (VA30), and VehicularA with 120 kmph (VA120). Since the channel environments PA3, PB3, VA30, and VA120 are widely known channel models, and defined in a 3rd Generation Partnership Project (3GPP) standard, detailed description thereof is omitted.

Referring to FIGS. 5A to 5D, in the case of allocating 1-tap channel estimators according to an exemplary embodiment of the present invention, the 1-tap channel estimators are allocated to taps having a power value of about −20 dB or more, and taps adjacent to the taps. According to an exemplary embodiment of the present invention, an operation for channel estimation is performed on only meaningful taps having power values of a predetermined size or more.

Figure 6:
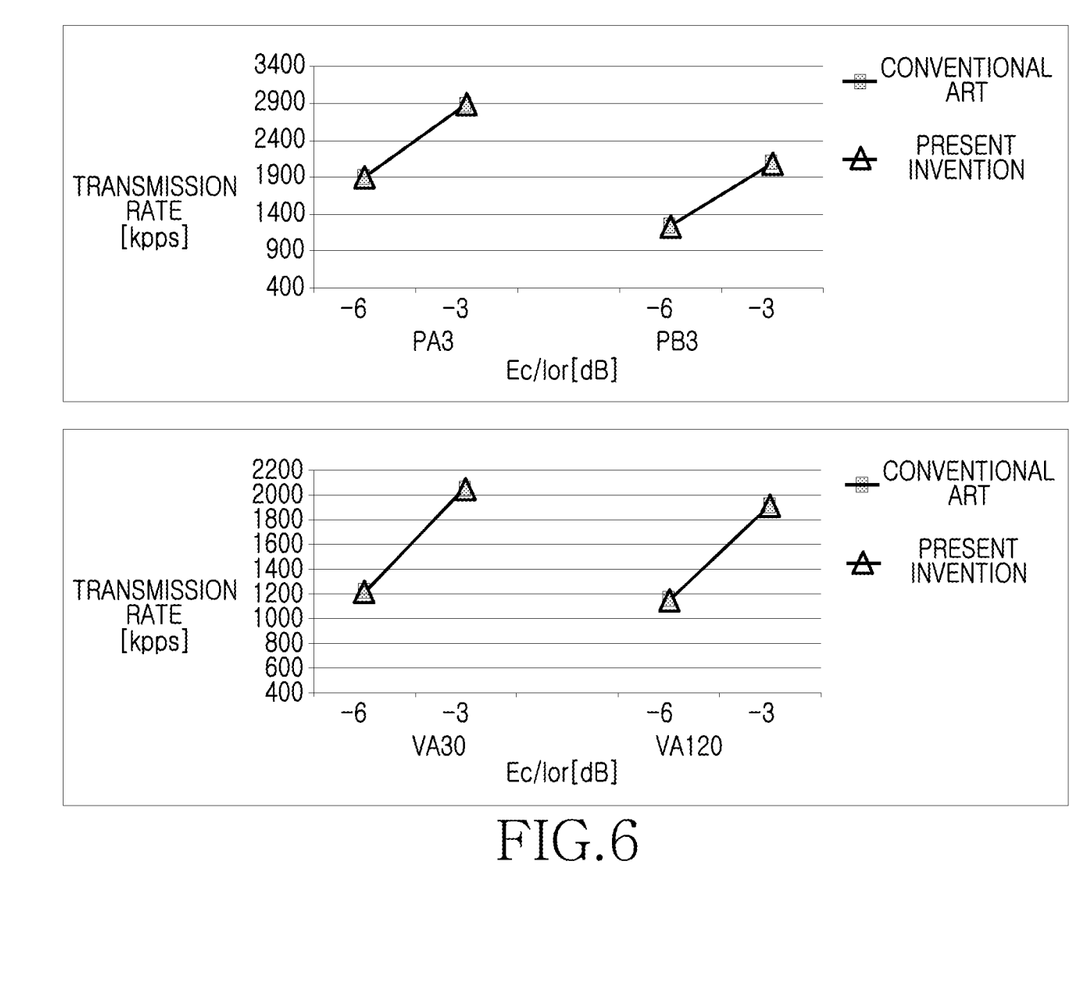
FIG. 6 is a view illustrating the performance of a wireless communication device according to an exemplary embodiment of the present invention.

FIG. 6 is a view illustrating the performance of a wireless communication device according to an exemplary embodiment of the present invention. FIG. 6 illustrates graphs representing a transmission rate versus entire power/chip energy (Ec/Ior) when simulation of an exemplary embodiment of the present invention has been performed under environments of PA3, PB3, VA30, and VA120. The simulation has assumed that a 16-Quadrature Amplitude Modulation (16QAM) technique has been applied as a modulation scheme.

Referring to FIG. 6, there is no difference in performance between the case where an exemplary embodiment of the present invention has been applied and the case of the conventional art. When an exemplary embodiment of the present invention is applied, a hardware resource and an amount of an operation are reduced without deterioration of performance.

Since a plurality of 1-tap channel estimators having one tap are used instead of a channel estimator having the number of taps of a fixed length in a wireless communication system, flexibility in channel estimation tap allocation is maximized under channel environments of long delay and sparse, performance of an equalizer is guaranteed, and a hardware resource of a channel estimator reduces.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus of a reception end in a wireless communication system, the apparatus comprising:
   a search unit for determining power values of respective taps inside a window based on a signal received via a pilot channel, and for classifying the taps into one or more meaningful taps and one or more noise taps; and
   an estimator for allocating one or more 1-tap channel estimators to the one or more meaningful taps, and for determining a channel estimation vector based on a channel estimation value of the one or more meaningful taps determined by the one or more 1-tap channel estimators.

2. The apparatus of claim 1, wherein when the number of the one or more meaningful taps exceeds the number of the one or more 1-tap channel estimators provided to the estimator, the estimator allocates the 1-tap channel estimators to the one or more meaningful taps in an order of a decreasing power value.

3. The apparatus of claim 1, wherein the estimator determines the channel estimation vector by listing the one or more channel estimation values in a time order, and sets a channel estimation value of a tap to which the one or more 1-tap channel estimators have not been allocated to '0+0j'.

4. The apparatus of claim 1, wherein the estimator determines the channel estimation vector by listing the one or more channel estimation values in a time order, and determines a channel estimation value of a tap to which the one or more 1-tap channel estimators have not been allocated through interpolation or low pass filtering.

5. The apparatus of claim 1, wherein the estimator additionally allocates one or more 1-tap channel estimators to a predetermined number of taps adjacent to the one or more meaningful taps.

6. The apparatus of claim 1, wherein the search unit calculates an entire power value, which is a sum of power values on the taps inside the window, sets a threshold value based on the entire power value, and classifies the taps inside the window according to the threshold value.

7. The apparatus of claim 6, wherein the threshold value is determined by multiplying the entire value by a specific constant greater than 0 and less than 1.

8. The apparatus of claim 1, wherein the search unit determines power values used for the classification by accumulating power values on the taps inside the window every $N_{coh}$ chip.

9. The apparatus of claim 1, wherein the search unit determines power values on the taps inside the window, and then performs a moving average or Infinite Impulse Response (IIR) filtering on the power values.

10. The apparatus of claim 1, wherein the apparatus is a component of a mobile terminal.

11. A channel estimation method of a reception end in a wireless communication system, the method comprising:
   determining power values of respective taps inside a window based on a signal received via a pilot channel;
   classifying the taps into one or more meaningful taps and one or more noise taps based on the power values;
   allocating one or more 1-tap channel estimators to the one or more meaningful taps; and
   determining a channel estimation vector based on channel estimation values of the one or more meaningful taps determined by the one or more 1-tap channel estimators.

12. The method of claim 11, wherein the allocating of the one or more 1-tap channel estimators comprises:
   when the number of the one or more meaningful taps exceeds the number of the provided 1-tap channel estimators, allocating the 1-tap channel estimators to the one or more meaningful taps in an order of a decreasing power value.

13. The method of claim 11, wherein the determining of the channel estimation vector comprises:
   listing the one or more channel estimation values in a time order; and
   setting a channel estimation value of a tap to which the one or more 1-tap channel estimators have not been allocated to '0+0j'.

14. The method of claim 11, wherein the determining of the channel estimation vector comprises:
   listing the one or more channel estimation values in a time order; and
   determining a channel estimation value of a tap to which the one or more 1-tap channel estimators have not been allocated through interpolation or low pass filtering.

15. The method of claim 11, further comprising additionally allocating one or more 1-tap channel estimators to a predetermined number of taps adjacent to the one or more meaningful taps.

16. The method of claim 11, wherein the classifying of the taps comprises:
   calculating an entire power value, which is a sum of power values on the taps inside the window;
   setting a threshold value based on the entire power value; and
   classifying the taps inside the window according to the threshold value.

17. The method of claim 16, wherein the threshold value is determined by multiplying the entire value by a specific constant greater than 0 and less than 1.

18. The method of claim 11, further comprising:
   before the classification of the taps, determining power values used for the classification by accumulating power values on the taps inside the window every $N_{coh}$ chip.

19. The method of claim 11, further comprising:
   determining power values on the taps inside the window; and
   performing a moving average or Infinite Impulse Response (IIR) filtering on the power values.

* * * * *